United States Patent Office 3,465,720
Patented Sept. 9, 1969

3,465,720
METHOD FOR GERM-FREE REARING OF SILKWORMS BY USING PLASTIC ISOLATOR
Homare Miyazawa and Shoichi Tarui, Kyoto-fu, and Masaki Kamada, Osaka, Japan, assignors to Gunze Limited, Kyoto-fu, Japan, and Takeda Chemical Industries, Ltd., Osaka, Japan
Filed July 7, 1967, Ser. No. 651,850
Claims priority, application Japan, July 11, 1966, 41/44,928
Int. Cl. A01k 47/06; A23k 1/00
U.S. Cl. 119—6                        14 Claims

ABSTRACT OF THE DISCLOSURE

An improved method of germ-free rearing silkworms with artificial diet, comprising rearing germ-free silkworms in a flexible bag which is made of air-tight plastic film having one or more air inlets and outlets with the interior sterilized. Sterile air is introduced into said air inlet so as to maintain the internal air pressure higher than normal, the relative humidity of the internal air is held substantially within the range of 60 to 100% and the $CO_2$ concentration of the internal air is kept lower than 3% by volume relative to the total amount of the internal air.

Background of the invention

The present invention relates to a method for germ-free rearing of silkworms.

Silkworms have long been reared on only mulberry leaves for the production of silk, which inevitable requires the cultivation of mulberry trees and, therefore, the rearing can not help being restricted by the quantity and quality of mulberry leaves influenced by seasonal conditions. Recently, although it has been realized that silkworms can be reared entirely on artificial diets disclosed in e.g. French patents Nos. 1,392,752, 1,394,330, and 1,468,486, and United States Patents Nos. 3,230,930 and 3,275,446, etc., it is still necessary to supply the diet 2 to 4 times per day. Appearance of such artificial diets as above, therefore, is not yet considered to be satisfactory, especially when the reduction of labor is taken into account.

On the other hand, germ-free animals such as rats, mice, guinea pigs, white leghorns, etc., have been bred for a special purpose in the fundamental field of medical science. However, since these germ-free animals are not yet always the same in various natures with those reared under natural conditions, they cannot be used even for the purpose of usual screening of medicines. The field in which they can be used is, therefore, not so wide, and for only some special medical purpose such germ-free animals can be used conveniently. Furthermore, as the known equipment employed for rearing germ-free animals is very complicated and expensive, the germ-free animals have been bred only for experimental purposes, which is far from the possibility of scaling up to an industrial production of the germ-free animals.

It has now been discovered that the germ-free silkworms grow and produce cocoons when the silkworms are reared with artificial diets in a flexible bag which is made of airtight plastic film, which has at least one air inlet and at least one air outlet, the inside being sterilized, and into which sterile air is allowed to flow through the air inlet so as to maintain the inside higher than the ambient pressure, the relative humidity of the inner air being between 60% and 100% and the $CO_2$ concentration of the inside air being less than 3% by volume relative to the total inner air volume.

It is an object of the present invention to provide a novel method for germ-free rearing of silkworms in the flexible-plastic bag mentioned above.

Another object of the present invention is to provide a method for rearing silkworms, which method may be worked all the year round, not subject to restriction by the output of mulberry leaves or by seasonal conditions.

The invention also contemplates providing a practical method for rearing silkworms, which method requires almost no man-power.

It is also the purpose of the invention to provide a method for rearing silkworms on an industrial scale.

Other objects and advantages will become apparent from the following description hereinafter provided and taken in conjunction with the accompanying drawing in which.

Figure 1:
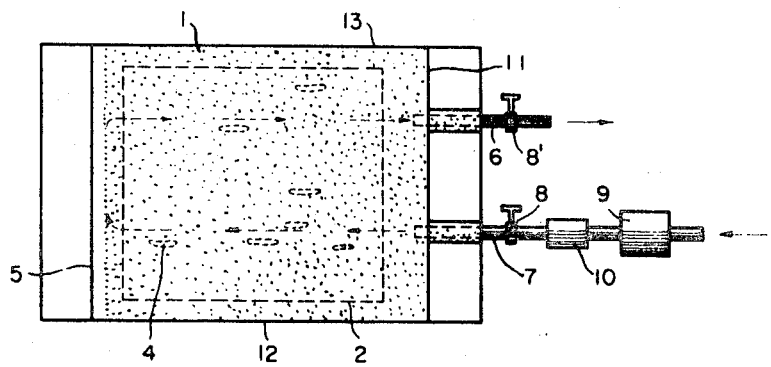
FIGURE 1 illustrates a plan view of one of the preferred germ-free flexible plastic bags of the present invention.

In carrying the present invention into practice, a flexible plastic bag is prepared from thin film of flexible plastics such as thermostablep lastics (e.g. polypropylene; fluorine-contained resin, polycarbonate, polyvinylacetate, saturated aromatic polyester resin, etc.) or thermo-plastic plastics (e.g. cellulose acetate, polyvinyl chloride, polyamide, polyethylene, etc.).

The sufficient thickness of the film usable for the bag is 0.01–0.2 mm., but plastic-films having 0.5 mm.-thick or more is usable for the present invention. These flexible plastic films may be jointed by heating or with adhesives to make a bag having suitable form such as square, rectangle, cube, ellipse prismoid cube, ellipsoid, cylindroid tube, etc. The bag does not have any frame or skeleton to keep its form, which is only kept by maintaining the inside pressure higher than the ambient pressure with the introduced sterile air. The bag has at least one sterile air inlet and at least one sterile air outlet, which inlet and outlet have generally a stopper or valve respectively, but, when the outlet is prepared from a slender tube of flexible plastic film and its diameter is very small as compared with the volume of the bag, it is needless to equip it with such stopper or valve. The positions of the inlet and outlet are optional as far as it is possible to keep the bag in good air-conditions. The area of the bag is enlarged depending on the growth of silkworms, and the approximate standard-area per one silkworm is as follows:

Stage (standard-area per one silkworm ($cm.^2$)):
| | |
|---|---|
| First | 0.3 |
| Second | 0.8 |
| Third | 2.1 |
| Fourth | 5.5 |
| Fifth | 21.0 |

The allowable deviation from this value is about plus or minus 30%. The growth of silkworms is restrained if the bag is too narrow but since too large a bag does not cause such restraint, the bag having the necessary area for the oldest stage may be used for the rearing at the beginning, when silkworms are reared for more than two stages.

The bag must be sterilized for the purpose of the germ-free rearing of silkworms. The bag made of thermoplastic plastic film may be sterilized by a sterilizer such as ethylene-oxide, β-propiolactone, formaldehyde, an aqueous solution of bleaching powder, formalin; etc. while the one made of thermostable plastic film may be sterilized by heating under an elevated pressure, below about 1.5 atmospheric pressure at a temperature of 110–120° C. for more than 20 minutes, preferably for 30–40 minutes, and/or by the use of the sterilizer mentioned above.

The artificial diet for silkworms usable in the present invention is provided by, for example, French Patents Nos. 1,392,752, 1,392,707, 1,394,330 and 1,468,486, United States Patents Nos. 3,275,446 and 3,230,930, etc. That is to say, it contains such ingredients as, the biting factor which stimulates silkworms to bite (e.g. β-sitosterol with or without flavonoids such as quercetin, morin, rutin, isoquercitrin), the swallowing factor which stimulates them to bite and swallow continuously (e.g. cellulose powder), polyhydroxy-carboxylic acid or its derivatives (e.g. chlorogenic acid, caffeic acid, gallic acid, gentisic acid, homogentisic acid, resoreylic acid, quinic acid, uronic acid, protocatechnic acid, etc.); hydroxybenzaldehyde (e.g. protocatechualdehyde, 3,4,5 - trihydroxybenzaldehyde, 2,3-dihydroxybenzaldehyde, 2,4-dihydroxybenzaldehyde, 4-hydroxybenzaldehyde, 2,4,6-trihydroxybenzaldehyde, etc.), choline and its derivatives, nucleic acid or its derivatives, sugar, inorganic phosphate, inorganic silicate, inositol, etc. As components of such diets, which are helpful for the growth of silkworms, there may be, for example, agaragar, sodium carboxymethylcellulose, methylcellulose, alginic acid; soybean powder, parched bean flour, defatted soybean powder, bean curd, dried fermented soybean powder, defatted and dried bean paste; cereal flour such as rice flour, barley flour, wheat flour, etc.; yeast products such as dry yeast, yeast extract, extracted fluid of yeast, extracted yeast cake; straw ashes; fish meal, animal or plant proteins; amino acids or their salts; vitamins (e.g. pantothenic acid, nicotic acid, vitamin $B_1$, vitamin $B_2$, vitamin $B_6$, vitamin $B_{12}$, vitamin C, vitamin D, biotin, folic acid, vitamin K, vitamin E, vitamin P, inositol, orotic acid, α-lipoic acid, etc.); inorganic salts (e.g. calcium carbonate, sodium carbonate, sodium hydrozencarbonate, sodium chloride); honey or its products; pectin; enzymes; antibiotics (e.g. tetracycline, chlortetracycline, oxytetracycline, streptomycin, dihydrostreptomycin, neomycin, kanamycin, picromycin, leucomycin, erythromycin, oleandomycin, trichomycin, chloramphenicol, penicillin; sulfa drugs, furan derivatives; glucuronic acid or its salt, amine, or ester, and attracting factor which attracts silkworms (terpenes such as citral, linalyl acetate, linalol, terpinyl acetate).

These artificial diets may be sterilized and then inserted into the sterilized flexible plastic bag under germ-free conditions, while, in the case of thermostable film bag, they may be sterilized together with the bag by heating at least at 110–120° C. for more than 20 minutes under an elevated pressure, below about 1.5 atmospheric pressure.

The kind of the artificial diets and their amounts to be supplied vary with the growth stages of silkworms. A roughly estimated amount of the artificial diets depending on growth stages is as follows:

Stage (amount of diets in dry weight per one silkworm (g.)):

| Stage | Amount |
| --- | --- |
| First | 0.001~0.05 |
| Second | 0.005~0.2 |
| Third | 0.1 ~0.4 |
| Fourth | 0.4 ~0.6 |
| Fifth | 3.2 ~4 |
| Total | 4–5 |

According to the present invention, the diets for sufficient amount for the period covering one or five stages may be supplied at one time and the silkworms will eat the supplied diets and grow up only by keeping the growth surroundings in good conditions (e.g., germ-free conditions, introduction of germ-free air, control of $CO_2$ gas concentration, temperature control, humidity control etc.). When the diets supplied is not sufficient for the total larval stages, the silkworms are supplied with new diets or transferred to another bag in germ-free conditions with or without enlarging the side of said bag. Although the silkworms may be reared throughout all larval stages with a single supplement of diets, it is desirable to transfer them to another bag containing new diets at one or two times in their larval stages, at that time the size of the bag may be changed to a larger one. The desirable transfering time is the beginning of the second, third, fourth or fifth stage; therefore, it may be supplied the diets covering the first to fourth stages at one time and then the diets covering the fifth stage, or the diets covering the first to third stages at one time and then the diets covering the fourth and fifth stages at another time (or reared with mulberry leaves in these stage), or the diets covering the first and second stages at one time, the diets covering the third and fourth stages at another time and then the diets covering the fifth stage (or rear with mulberry leaves in this stage), or the diets covering the first stage, the diets covering the second and third stages, the diets covering the fourth stage and then the diets covering the fifth stage, etc.

The bag is in the rearing conditions, inflated with the introduction of sterile air from the stirile air inlet and the inside pressure of the bag is maintained higher than the ambient pressure, preferably less than 1.2 atmospheric pressure. The sterile air may be obtained by an air filter packed with glass wool, sponge or polyurethane foam, polyvinyl acetate sponge, etc. and/or by applying a sterile lamp, etc. Furthermore, each sterile inlet of the isolater may be also equipped with the air filter mentioned above. After being inflated completely with the introduction of sterile air, the bag need not be ventilated generally, but it is necessary to be ventilated continuously or intermittently with sterile air to keep the $CO_2$ concentration under 3% by volume, preferably less than 1% by volume, to keep the relatively humidity at 60–100% and to keep the inner temperature at 25–28° C.

For the purpose of giving those skilled in the art a better understanding of the invention, the following illustrative examples are given.

Figure 2:
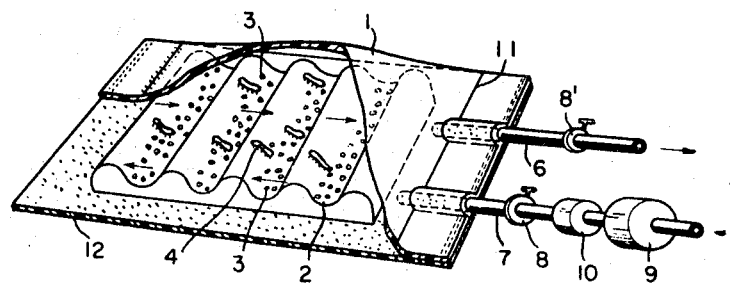
FIGURE 2 is a perspective view and partial-sectional view of the bag of FIGURE 1.
Figure 3:
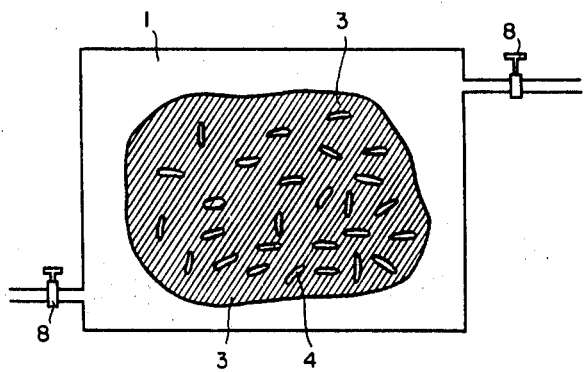
FIGURE 3 is a plan view of another preferred germ-free bag of the present invention.

Referring to the germ-free bag shown in FIGURES 1 and 2, the plastic film (polypropylene) bag is heat-sealed at the parts indicated by the numbers 11, 12 and 13, and clip-sealed, chuck-sealed or heat sealed at the part indicated by 5. The bag is equipped with a sterile air inlet 7, sterile air outlet 6, stop cocks 8 and 8' which are attached to the sterile air inlet and outlet respectively, compression pump 9 and sterile air filter 10 which is packed with glass wool and inserted between stop cock 8 and compression pump 9. The sterile air, through the sterile air filter, flows in the bag as indicated by the arrows in FIGURES 1 and 2. In such a bag as is shown in these figures, the silkworms 4 are put on an aluminium dish 2 with the artificial diet 3.

The sterilized silkworm eggs on the day just before hatching are placed one by one on the sterilized aluminium dish, and the dish is inserted under germ-free conditions from the part 5 of the plastic bag containing artificial diets, followed by sealing of the part 5. After being kept in a dark place for one night, the bag is exposed to the light to hatch the silkworm eggs, and then the dish is upset over the artificial diet to spread the newly hatched larvae of silkworms, which eat the diets an grow up in the bag which is ventilated to keep the inside of the bag in good conditions.

The supplement of new diets at the rearing time is carried out, for example, to insert the artificial diets sterilized in the polypropylene bag, or to insert the sterilized diets from the nozzle of germ-free diets supplier. The changing of the capacity of bag is realized by spreading the folded part, by transferring the silkworms into another bag containing new diets, or by joining a side of the old bag with one side of another bag and, after sterilizing the inside of the thus jointed part, removing the clips of both old and new bag.

The following shows the growth rate of the silkworms reared at 25° C. by the process of the present invention, using the artificial diets mentioned below:

|  | Parts |
|---|---|
| Cellulose powder | 5.0 |
| Defatted soybean powder | 2.3 |
| Starch | 1.0 |
| Sucrose | 1.0 |
| Agar powder | 0.2 |
| Wesson's minerals* | 0.15 |
| β-Sitosterol and inorganic phosphate | 0.25 |
| Protocatechualdehyde | 0.05 |
| Vitamin C | 0.05 |
| Linoleic acid | 0.15 |
| Acetylcholine | 0.01 |
| Dihydrostreptomycin | 0.01 |
| Distilled water | 20 |

* Consisting of NaCl, KCl, $KH_2PO_4$, $Ca_3(PO_4)_2$, $CaCO_3$, $FePO_4$, $MgSO_4$, $KAl_2(SO_4)_3 \cdot 12H_2O$, $CuSO_4$, $MnSO_4$ and KI in the weight ratio of 52.5 : 60.0 : 15.5 : 74.5 : 10.5 : 7.4 : 45.0 : 0.05 : 0.2 : 0.1 : 0.03.

The control silkworms are reared at 25° C. in a test tube having 5 cm. in diameter and 30 cm. in length and being stoppered with the plug of sterilized cotton-wool so as to be naturally ventilative.

TABLE 1.—THE GROWTH RATES OF THE SILKWORMS IN 9 DAYS AFTER HATCHING OF SILKWORMS WERE CALCULATED BY SAMPLING 100 SILKWORMS EACH

| Test silkworms | Duration | | | Total (percent) |
|---|---|---|---|---|
| | Percentage of second stage silkworms | Percentage of third moulting silkworms | Percentage of third stage silkworms | |
| Control | 31 | 53 | 16 | 100 |
| The present process | 11 | 51 | 38 | 100 |

TABLE 2.—THE BODY WEIGHTS OF THE SILKWORMS IMMEDIATELY AFTER ECDYSIS OF THE THIRD MOULTING WERE CALCULATED BY SAMPLING 60 SILKWORMS EACH

Average body weight of one silkworm (mg.):
 Control _____ 28.7
 The present process _____ 28.8

TABLE 3.—THE GROWTH RATES OF THE SILKWORMS IN 19 DAYS FROM HATCHING OF SILKWORMS WERE CALCULATED BY SAMPLING 100 SILKWORMS EACH

| Test silkworms | Duration | | | Total (percent) |
|---|---|---|---|---|
| | Percentage of fourth stage silkworms | Percentage of fourth moulting silkworms | Percentage of fifth stage silkworms | |
| Control | 16 | 21 | 63 | 100 |
| The present process | 7 | 11 | 82 | 100 |

TABLE 4.—THE BODY WEIGHTS OF THE SILKWORMS IMMEDIATELY AFTER ECDYSIS OF THE FIFTH MOULTING WERE CALCULATED BY SAMPLING 60 SILKWORMS EACH

Average body weight of one silkworm (g.):
 Control _____ 0.78
 The present process _____ 0.80

Table 5

The percentage of cocoons against hatched silkworms was calculated by sampling 1500 silkworms each.

Percentage of cocooning (percent)
Control _____ 83
The present process _____ 87

TABLE 6.—THE AVERAGE WEIGHT OF COCOONS AND COCOON LAYER RATIO WERE CALCULATED BY SAMPLING 60 COCOONS EACH

| | Average weight of cocoon (g.) | Average cocoon layer ratio (percent) |
|---|---|---|
| Control | 1.72 | 18.7 |
| The present process | 1.76 | 19.3 |

In the above disclosures, "g." and "mg." are "gram" and "milligram," respectively. Temperatures are all uncorrected, and percentages are all on the weight basis, unless otherwise specified.

What is claimed is:

1. A method of rearing silkworms with artificial diet comprising the steps of providing a flexible bag made of airtight plastic film and having at least one air inlet and at least one air outlet, sterilizing the inside of said bag to provide a germ-free habitat, sealing germ-free silkworms in said bag, providing an artificial diet for feeding said silkworms, introducing sterile air into said bag through said air inlet and discharging air from said bag through said air outlet, controlling said introduction and discharge of air to maintain the air pressure in said bag higher than ambient air pressure, controlling the relative humidity of the air inside said bag to maintain said relative humidity at a value between 60% and 100%, and controlling the $CO_2$ concentration inside said bag to maintain said concentration at a value less than 3% by volume of the air inside said bag.

2. A method as claimed in claim 1, wherein the artificial diet is supplied in an amount sufficient to rear said silkworms for a period covering not less than one stage.

3. A method as claimed in claim 2, wherein newly hatched larvae of silkworms are put in said plastic bag.

4. A method as claimed in claim 3, wherein said newly hatched larvae are put in said plastic bag containing a diet for the period covering the first to the fourth stages.

5. A method as claimed in claim 3, wherein said newly hatched larvae are put in said plastic bag containing a diet for the period covering the first to the third stages.

6. A method as claimed in claim 3, wherein said newly hatched larvae are put in said plastic bag containing a diet for the period covering the first and second stages.

7. A method as claimed in claim 6, wherein said larvae at the beginning of the third stage are transferred to another like flexible plastic bag containing a diet for the period covering the third and fourth stages.

8. A method as claimed in claim 3, wherein said newly hatched larvae are put in said plastic bag containing a diet for the period covering the first stage only.

9. A method as claimed in claim 8, wherein the larvae at the beginning of the second stage are transferred into a like flexible bag containing a diet for the period covering the second and third stages, the larvae at the beginning of the fourth stage are transferred into a like flexible bag containing a diet for the period covering the fourth stage, and the larvae at the beginning of the fifth stage are transferred into a like flexible plastic bag containing a diet for the period covering the fifth stage.

10. A method as claimed in claim 1, wherein said plastic bag is formed of polypropylene.

11. A method as claimed in claim 1, wherein the temperature inside said plastic bag is maintained between 25° C. and 28° C.

12. A method as claimed in claim 1, wherein the artificial diet for the silkworms is sterilized by heating for at least 20 minutes at a temperature between 110° C. and 120° C. and a pressure above atmospheric and below 1.5 atmospheres.

13. A method as claimed in claim 1, wherein said plastic bag is made of plastic film having a thickness between 0.01 and 0.2 mm.

14. A method as claimed in claim 1, wherein the air inside said plastic bag is maintained at a pressure not higher than 1.2 atmospheres.

References Cited

UNITED STATES PATENTS

| | | | |
|---|---|---|---|
| 1,096,116 | 5/1914 | Mead | 119—6 |
| 2,809,463 | 10/1957 | Buss | 43—55 |
| 2,885,819 | 5/1959 | Newell et al. | 43—55 |
| 2,949,882 | 8/1960 | Thomas | 119—3 |
| 3,283,743 | 11/1966 | Dibelius | 119—1 |
| 3,295,983 | 1/1967 | Kato et al. | 99—2 |
| 3,299,253 | 1/1967 | Lawson | 128—1 X |
| 3,343,520 | 9/1967 | Schwarz | 119—15 |
| 3,367,308 | 2/1968 | Quattrone et al. | 119—15 |

ALDRICH F. MEDBERY, Primary Examiner